United States Patent [19]
Lee

[11] Patent Number: 6,161,817
[45] Date of Patent: Dec. 19, 2000

[54] SERPENTINE BELT TOOL

[76] Inventor: Kin Pong Lee, 5732 N. 28th St., Arlington, Va. 22207

[21] Appl. No.: 09/152,681

[22] Filed: Sep. 14, 1998

[51] Int. Cl.[7] ....................................................... B66F 3/00
[52] U.S. Cl. ............................................................ 254/131
[58] Field of Search ................................ 29/267; 254/25, 254/120, 131, 129, 130

[56] References Cited

U.S. PATENT DOCUMENTS

| | | | |
|---|---|---|---|
| 4,380,326 | 4/1983 | Marzorati et al. | 254/131 |
| 5,075,945 | 12/1991 | Krzecki | 29/267 |
| 5,529,287 | 6/1996 | Pelosi, Jr. et al. | 254/131 |
| 5,617,621 | 4/1997 | Fedele | 29/267 |

OTHER PUBLICATIONS

Mac Tools Catalog—North America MT98CAT Jan. 1998, cover & p. 310.

*Primary Examiner*—Robert C. Watson
*Attorney, Agent, or Firm*—Breiner & Breiner

[57] ABSTRACT

A serpentine belt tool is provided allowing convenient release of tension on automobile serpentine belts having spring-loaded tensioners. The tool fits in the space within the tensioner behind the idler pulley arm, allowing the user to work above the engine, and avoiding other more cumbersome methods. The tool is configured specifically for use with certain Ford automobiles.

3 Claims, 1 Drawing Sheet

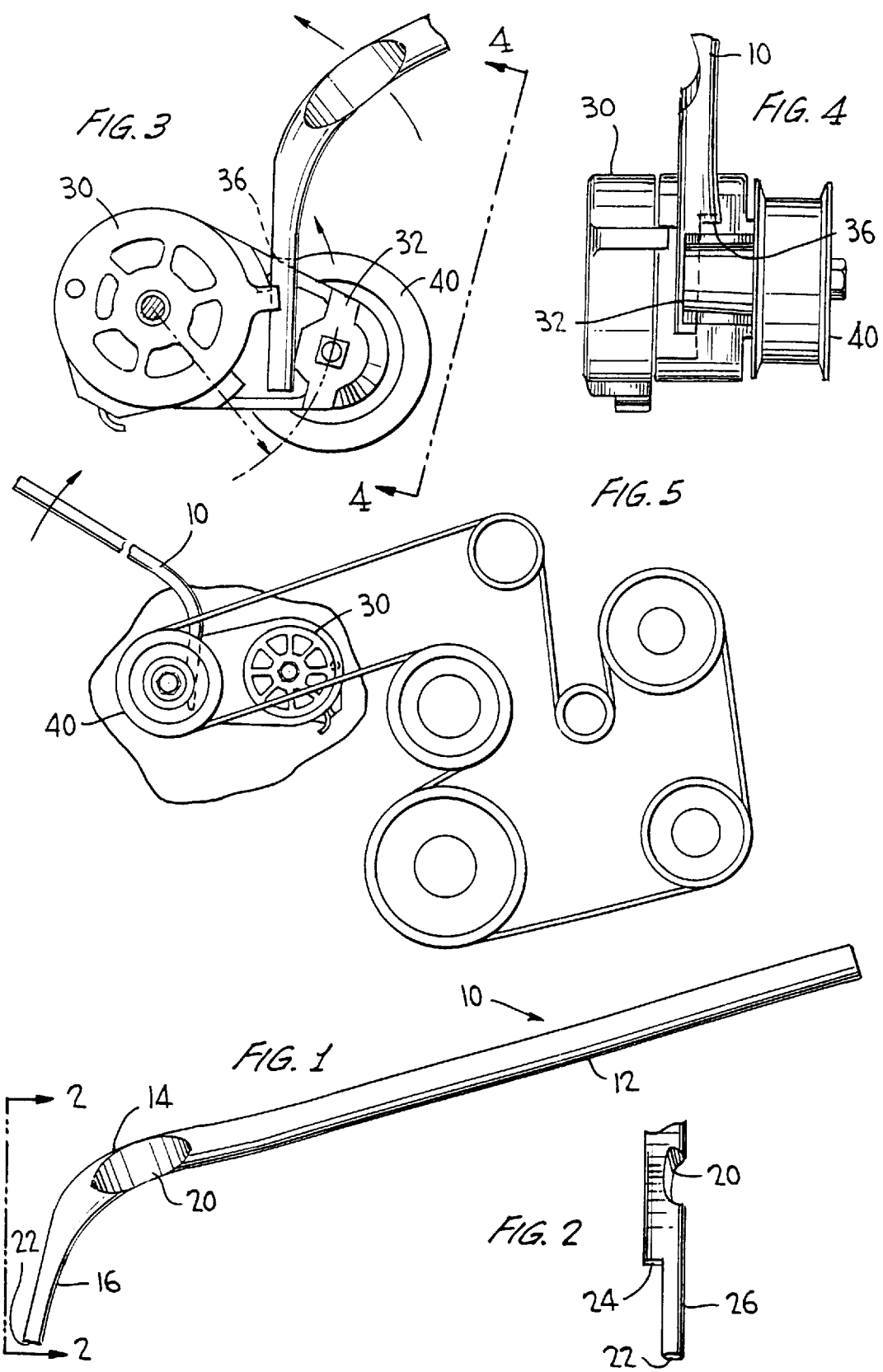

SERPENTINE BELT TOOL

FIELD OF INVENTION

The present invention relates to a tool for releasing serpentine belt tension in automobiles. More particularly, the invention relates to a novel serpentine belt tool which works more quickly and conveniently than existing tools.

BACKGROUND OF THE INVENTION

Many automobile functions are powered by a serpentine belt running between several wheels located on or near the engine. Some engines employ a spring-loaded idler or tensioner to maintain tension on the belt during operation. When the belt needs replacing, the belt tension must first be reduced.

Several tools exist for the purpose of releasing serpentine belt tension.

For example, the Mac Tools 1998 catalog shows a socket fitting serpentine belt tool at page 310. This tool requires a socket fitting to match the retaining bolt on the car's idler pulley. This type of tool is less than ideal. Work space may be very limited in the area around the retaining bolt, making tensioning operations slow and awkward. Further, the tool handle may sit in an awkward position, making it difficult for the user to apply leverage. Further, the socket may not fit the retaining bolt.

The Mac Tools 1998 catalog at page 310 also shows serpentine belt tools which fit behind the idler pulley, within the tensioner area of the idler. This tool may avoid some of the difficulties inherent in socket fitting serpentine belt tools. However, the tools will not operate with all car models and tensioners, including 1989 to 1995 Taurus, Sable and Continental model automobiles.

There is a need for a serpentine belt tool which works conveniently and quickly and is suitable for use on 1989 to 1995 Taurus, Sable, and Continental model automobiles having 3.8 liter engines and on 1990 to 1992 Tempo and Topaz model automobiles with 2.3 liter engines.

SUMMARY OF THE INVENTION

An object of the present invention is to provide a serpentine belt tool for releasing tension on belts with spring-loaded tensioners.

A further object of the invention is to provide a serpentine belt tool that works quickly and conveniently, by avoiding socket fittings and awkward tool handle positions.

A still further object of the invention is to provide a serpentine belt tool for use with tensioners on 1989 to 1995 Taurus, Sable, and Continental model automobiles with 3.8 liter engines, and on 1990 to 1992 Tempo and Topaz model automobiles with 2.3 liter engines.

The serpentine tool of the present invention comprises a rigid rod having a handle end, a bend and a key at the tool end. The key at the tool end includes a finger portion and a shoulder portion. The finger is constructed to fit within the channel of the tensioner of the belt system, located behind the idler pulley. The shoulder portion of the key seats on a top portion of the tensioner to position the tool and to provide leverage when using the tool. The tool has a handle portion extending at an angle away from the key, allowing the user to exert leveraged force on the tensioner.

In use, the handle extends above the engine, clear of any obstruction which could hinder movement of the tool. After inserting the key behind the tensioner arm, the user moves the handle forward to release belt tension.

BRIEF DESCRIPTION OF THE DRAWINGS

In the drawings:

FIG. 1 shows a side view of a tool according to the present invention;

FIG. 2 shows the key and bend portions of the tool viewed along line 2—2 FIG. 1;

FIG. 3 shows a portion of the tool inserted within a belt tensioner

FIG. 4 shows a view along line 4—4 of FIG. 3; and

FIG. 5 shows the tool inserted within a belt tensioner and also shows a schematic of the drive belt system for a 3.8 liter engine.

DESCRIPTION OF THE PREFERRED EMBODIMENT

Having described the invention in general terms, a complete description of the preferred embodiment will be set forth in reference to the drawings.

Referring to FIG. 1, a steel serpentine belt tool 10 according to the present invention is shown along its length. Tool 10 includes a handle 12, a bend 14 and key 16 at the tool end. Handle 12 is a three-quarter inch diameter steel rod extending approximately eighteen inches from the handle end 18 to bend 14. Bend 14 is at an approximately 35 to 55 degree angle in the rod, a 45 degree bend being preferred. Bend 14 includes a dimple 20. Dimple 20 is approximately two and one quarter inches in length and has a thickness of no more than three quarters of an inch. Dimple 20 is necessary to provide sufficient clearance when the tool is used on the 2.3 liter engines. Key 16 extends three inches from bend 14 to tool end 22.

Referring now also to FIG. 2, the key and bend portions of the tool are shown along line 2—2 in FIG. 1. Key 16 includes a partially flattened segment of rod 10 and includes shoulder 24 and finger 26. The shoulder 24 and finger 26 are formed by a notch cut-out of rod 10 extending two inches from tool end 22 toward bend 14. Each of finger 26 and shoulder 24 has a square profile. Finger 26 has sides of approximately three-eights of an inch.

Referring now to FIG. 3, a view from the rear of the engine, the belt tool 10 is shown in use with a tensioner 30 and idler pulley 40. Tensioner 30 includes an arm 32 and there is a channel 34 between the body of tensioner 30 and arm 32. The tensioner includes a top portion 36. The key 16 of the tool 10 is inserted by the user into channel 34 behind the idler pulley 40. Finger 26 fits within this channel. As best seen in FIG. 4, shoulder 24 seats on the top portion 36 of the tensioner. Once in place, the user pulls tool 10 forward and the serpentine belt tension will slacken, allowing belt removal.

Referring now to FIG. 5, tool 10 is shown in use from a front view of the engine. Serpentine belt 50 is shown connecting a plurality of wheels to idler pulley 40. The tool is shown positioned behind the tensioner pulley. Handle 12 is moved forward by the user to release belt tension.

While the preferred embodiments of the invention have been described in detail above, various modifications and variations of the invention are possible in light of the above teachings. It is, therefore, understood that the invention may be practiced otherwise than as specifically described.

It is claimed:

1. A serpentine belt tool comprising:
   a rigid rod including a handle end, a bend, and a tool end;
   said bend creating an angle between said handle end and said tool end;

said rod further comprising a finger portion and a shoulder portion at said tool end;

said finger portion, in substantially square profile, extending from said tool end to said shoulder portion; and said shoulder portion having a surface extending from said finger portion substantially perpendicular to the length of said finger portion and in a direction substantially perpendicular to a plane defined by said bend.

2. A serpentine belt tool according to claim 1, wherein said angle is between approximately 35 and 55 degrees; said rod extends from between 1 to 2 feet from said handle end to said bend; said finger is approximately ⅜ inch in width; said shoulder portion extends approximately ¼ to ¾ inch from said finger portion.

3. A serpentine belt tool constructed and arranged to be compatible with serpentine belt tensioners in 1989 to 1995 models of Taurus, Sable and Continental automobiles with 3.8 liter engines and 1990 to 1992 models of Tempo and Topaz automobiles having 2.3 liter engines, said tool comprising:

a rigid rod including a handle end, a bend and a tool end;

said bend creating an angle between said handle end and said tool end;

said rod further comprising a finger portion and a shoulder portion at said tool end;

said finger portion, in substantially square profile, extending from said tool end to said shoulder portion; and said shoulder portion having a surface extending from said finger portion perpendicular to the length of said finger portion and in a direction perpendicular to a plane defined by said bend.

* * * * *